United States Patent
Kwasniewicz (10) Patent No.: US 7,650,986 B2
(45) Date of Patent: Jan. 26, 2010

(54) SHAKER CONVEYOR ASSEMBLY HAVING AN ELECTRONICALLY CONTROLLABLE STROKE SPEED

(75) Inventor: Ronald W. Kwasniewicz, Walled Lake, MI (US)

(73) Assignee: Magnetic Products, Inc., Highland, MI (US)

( * ) Notice: Subject to any disclaimer, the term of this patent is extended or adjusted under 35 U.S.C. 154(b) by 555 days.

(21) Appl. No.: 11/490,013

(22) Filed: Jul. 20, 2006

(65) Prior Publication Data

US 2007/0017783 A1 Jan. 25, 2007

Related U.S. Application Data

(60) Provisional application No. 60/701,643, filed on Jul. 22, 2005.

(51) Int. Cl.
*B65G 25/04* (2006.01)
(52) U.S. Cl. .................... 198/750.8; 198/751; 198/766
(58) Field of Classification Search ............. 198/750.1, 198/750.8, 751, 753, 766
See application file for complete search history.

(56) References Cited

U.S. PATENT DOCUMENTS

| | | | |
|---|---|---|---|
| 1,343,648 A | 6/1920 | Smith | |
| 2,214,755 A | 9/1940 | Tafel | 198/220 |
| 2,378,979 A | 6/1945 | Burt | 198/220 |
| 2,473,193 A | 6/1949 | Campion | 198/220 |
| 2,800,857 A | 7/1957 | Yarmak | 103/3 |
| 3,212,630 A | 10/1965 | Allen et al. | 198/220 |
| 3,222,807 A | 12/1965 | Swank | 40/426 |
| 3,712,472 A | 1/1973 | Elliott | 210/222 |
| 3,838,769 A | 10/1974 | Fishburne et al. | 198/218 |
| 4,112,999 A | 9/1978 | Gasper | 164/154 |
| 4,192,419 A | 3/1980 | Brodin | 198/750 |
| 4,339,029 A | 7/1982 | Wilson | 198/750 |

(Continued)

FOREIGN PATENT DOCUMENTS

CA 2277508 1/2001

(Continued)

OTHER PUBLICATIONS

Brochure-- Lahr Conveyors for the Pressroom, Diversatool, Inc.

(Continued)

*Primary Examiner*—Douglas A Hess
(74) *Attorney, Agent, or Firm*—Bliss McGlynn, P.C.

(57) ABSTRACT

A shaker conveyor assembly for moving objects includes a conveying element adapted for movement in first and second directions in repeated rectilinear fashion so as to convey items placed on the conveying element in one of the directions. The assembly includes an electric drive assembly having an output, a control assembly, and at least one sensor adapted to sense movement of the output. The control assembly provides a first level of electrical power to the electric drive assembly during a first portion of reciprocal movement and a second level of power to the electric drive assembly during a second portion of reciprocal movement. In addition, the control assembly provides selective control over the duration of the first and second portions of the reciprocal movement thereby controlling the speed of each of the directions of reciprocal movement of the conveying element.

17 Claims, 4 Drawing Sheets

U.S. PATENT DOCUMENTS

| | | | | |
|---|---|---|---|---|
| 4,505,380 | A | | 3/1985 | McLemore et al. ......... 198/750 |
| 4,508,208 | A | | 4/1985 | Preedy ...................... 198/751 |
| 4,854,444 | A | | 8/1989 | Iwamoto ..................... 198/750 |
| 5,054,606 | A | * | 10/1991 | Musschoot .................. 198/751 |
| 5,147,031 | A | | 9/1992 | Carpenter ................... 198/750 |
| 5,178,258 | A | | 1/1993 | Smalley et al. ........... 198/750.8 |
| 5,390,781 | A | | 2/1995 | Foster ....................... 198/750 |
| 5,489,018 | A | | 2/1996 | Foster ..................... 198/750.5 |
| 5,588,522 | A | | 12/1996 | Foster et al. ................ 198/775 |
| 5,676,514 | A | | 10/1997 | Higman et al. ............. 414/339 |
| 5,794,757 | A | | 8/1998 | Svejkovsky et al. ...... 198/750.8 |
| 5,850,906 | A | * | 12/1998 | Dean ....................... 198/750.8 |
| 5,979,640 | A | * | 11/1999 | Horton ...................... 198/770 |
| 6,006,896 | A | | 12/1999 | Foster ..................... 198/750.5 |
| 6,026,949 | A | | 2/2000 | Foster ..................... 198/750.5 |
| 6,056,113 | A | | 5/2000 | Foster ..................... 198/750.5 |
| 6,079,548 | A | | 6/2000 | Svejkovsky et al. ...... 198/750.8 |
| 6,189,683 | B1 | | 2/2001 | Svejkovsky et al. ......... 198/769 |
| 6,193,050 | B1 | * | 2/2001 | Svejkovsky et al. ...... 198/347.2 |
| 6,209,713 | B1 | | 4/2001 | Takahashi et al. ........ 198/750.8 |
| 6,237,748 | B1 | | 5/2001 | Kroger ....................... 198/763 |
| 6,276,518 | B1 | * | 8/2001 | Wierman .................. 198/752.1 |
| 6,286,658 | B1 | | 9/2001 | Hufford ..................... 198/766 |
| 6,311,832 | B1 | | 11/2001 | Kwasniewicz et al. ...... 198/619 |
| 6,398,013 | B1 | | 6/2002 | Svejkovsky et al. ...... 198/750.8 |
| 6,415,911 | B1 | | 7/2002 | Svejkovksy et al. ...... 198/750.1 |
| 6,415,912 | B1 | | 7/2002 | Tamlin .................... 198/750.8 |
| 6,435,337 | B1 | * | 8/2002 | Sahlberg .................... 198/766 |
| 6,439,374 | B2 | | 8/2002 | Kroger ....................... 198/763 |
| 6,439,375 | B1 | | 8/2002 | Foster et al. ................ 198/775 |
| 6,490,941 | B1 | * | 12/2002 | Hur ............................... 74/25 |
| 6,527,104 | B2 | * | 3/2003 | Svejkovsky et al. ......... 198/769 |
| 6,598,733 | B2 | * | 7/2003 | Kato ....................... 198/750.1 |
| 6,634,488 | B2 | | 10/2003 | Tamlin .................... 198/750.8 |
| 6,708,815 | B2 | * | 3/2004 | Kato ....................... 198/750.8 |
| 6,722,492 | B2 | | 4/2004 | Trestain ..................... 198/768 |
| 6,880,693 | B2 | | 4/2005 | Trestain ..................... 198/768 |
| 6,899,218 | B2 | | 5/2005 | Kwasniewicz et al. ... 198/750.7 |
| 6,988,611 | B2 | | 1/2006 | Kwasniewicz et al. ... 198/750.7 |
| 7,083,042 | B2 | | 8/2006 | Kwasniewicz et al. ... 198/750.7 |
| 7,216,757 | B1 | * | 5/2007 | Patterson et al. ......... 198/750.8 |
| 7,290,648 | B2 | * | 11/2007 | Buonomo ................ 198/750.2 |
| 7,387,198 | B2 | * | 6/2008 | Thomson ..................... 198/770 |

FOREIGN PATENT DOCUMENTS

| | | |
|---|---|---|
| CA | 2313777 | 1/2001 |
| CA | 2432418 | 12/2003 |
| WO | WO 01/76988 A1 | 10/2001 |

OTHER PUBLICATIONS

Brochure-- Modular Slug--Vayor the Economical Solution to your Material Transporting Needs, Woodcraft Conveyors, 1991.
Brochure-- Increase Efficiency with Bunting Low Profile and Special-Purpose Conveyors, Bunting Magnetics, Co.
Brochure-- Model AAA Ultra-Low Profile Model, Livonia Magnetics.
Mar. 19, 2009 Office Action for U.S. Serial No. 11/784,138.
Jun. 19, 2009 Amendment for U.S. Serial No. 11/784,138.
Oct. 29, 2009 Final Office Action for U.S. Serial No. 11/784,138.

* cited by examiner

SHAKER CONVEYOR ASSEMBLY HAVING AN ELECTRONICALLY CONTROLLABLE STROKE SPEED

CROSS-REFERENCE TO RELATED APPLICATION(S)

This application claims the benefit of U.S. Provisional Patent Application Ser. No. 60/701,643 entitled, "Shaker Conveyor Assembly Having An Electronically Controllable Stroke Speed," filed on Jul. 22, 2005.

BACKGROUND OF THE INVENTION

1. Field of the Invention

The present invention is directed toward beltless conveyors and, more specifically, to a shaker conveyor having an electronically controllable stroke speed.

2. Description of the Related Art

Conveyors are well known material handling devices that have application in a wide variety of environments for transporting objects from one place to another. For example, one type of conveyor employs a belt formed into an endless loop which is entrained about at least a pair of rollers spaced apart from one another and usually located at the opposed marginal ends of the conveyor. The rollers have sprockets at either end thereof. The spaced rollers are interconnected by a pair of chains entrained about the sprockets at either end of the rollers. An electric or hydraulic motor is usually employed to power the sprockets and continuously moves the belt over a substantial length of the conveyor between the rollers. In this way, objects may be transported by the conveyor over its length.

Conveyors often find applications in manufacturing environments. For example, in metal stamping operations, conveyors are employed to move parts between successive presses or from a press into a bin. In addition, conveyors are used for inspecting, transporting and assembly situations and can assist in maximizing production by removing parts, slugs or other scrap and materials from under low clearance areas like punch press dies and permitting continuous operation of the press. However, belted conveyors suffer from the disadvantage that the belts are often cut by the sharp edges of the metal parts formed in stamping operations. The useful life of the belts are reduced and the belts must be replaced more frequently. Frequent belt replacement increases the maintenance costs of the stamping operation. Further, stamped parts and other debris may pass through the damaged belts and jam or foul the inner workings of the conveyor drive system.

In part to avoid these problems, beltless conveyors are often employed in certain manufacturing operations. One type of beltless conveyor known in the related art moves items along the length of a conveyor by a physical reciprocating action. The material to be moved is transported in or on a table, channel, or trough. The reciprocating action of the conveyor is faster in one lineal direction than the other thereby causing the material to be moved with each forward stroke of the conveyor. The inherent reciprocating action of these types of beltless conveyers causes them to be generally referred to as shaker conveyors. Shaker conveyors obviously do not suffer from cuts or worn belts and thus have been adopted in numerous manufacturing environments.

A shaker conveyor may even be used to transfer corrosive, high-temperature, heavy, or other difficult to transport materials from place to place. For example, hot metal castings, particulate material, or other material difficult to transport due to physical or chemical characteristics can be transported by a shaker conveyor. The flexibility as to different types of materials is derived from the conveyor table or trough, which supports the material being carried. The shaker table can be made of materials resistant to heat, corrosion, or physical or chemical problems caused by the items being conveyed.

As previously mentioned, to convey the items or material on the table, the shaker table is accelerated in the direction of a desired material movement to reach a maximum forward velocity and then the direction of movement of the table is rapidly reversed so that the material slides along the table in the desired direction. As the table moves in the reverse direction, the material decelerates and comes to rest, and is then subject to the next reciprocal forward movement of the table so that there is little or no backward sliding of material being conveyed. In this manner, during one of the reciprocal movements, or strokes, the table provides a griping action on the material being conveyed. Conversely, the table provides a sliding action on the material being conveyed during the opposite reciprocal movement.

There are a number of conventional prior art shaker mechanisms that achieve the desired result of a forward motion of material by using a reciprocating action. These conventional shaker conveyors use crankshafts or other eccentrics with linkage arms to achieve the desired reciprocal motion, often with heavy flywheels. The linkage arms are pivotably attached to the flywheel or eccentric at one end and are likewise pivotably attached to the shaker table at the one ends. By the inherent physical differences designed into the linkage arms or the placement of their attachment points, or through the use of a cam or other physical device, the reverse movement of the shaker table may be faster than the forward movement. While these types of drive mechanisms provide satisfactory reciprocal motion, the operating elements and linkages are complex, and tend to be difficult to manufacture. These complex shaker assemblies are also expensive to maintain. More specifically, the linkage arms used to provide the reciprocating motion have a tendency to get out of line, reducing the efficiency of the shaker and causing further operational problems.

Furthermore, having a number of linkage arms with generally fixed attachment points, or the use of a cam or other physical device to establish the speed of the forward and reverse strokes of the shaker table makes speed adjustments to the shaker table problematic. Efficient shaker conveyance of materials directly relates to tailoring the proper forward and reverse strokes speeds of the shaker for the particular material or items being conveyed. In conventional shaker conveyors, the tailoring, or tuning of the shaker stroke speed is accomplished by the design of the linkages, or more specifically, by the length of the linkage arms or the placement of their associated attachment (fulcrum) points. If a cam or other physical device establishes stroke speed, then tuning the stroke speed relates to the shape or profile of the cam assembly. However, the tuned efficiency of the prior art conveyors for conveying heavy material loads does not directly translate to conveying lighter loads, nor does the tuned efficiency of conveying light loads translate to conveying heavy loads. More specifically, with conventional shaker conveyers, when it is desired to change the speed of the strokes that are tuned for conveying one type of item of a particular weight to convey another item of different weight, the linkage arms must be replaced or their linkage points must be physically relocated to tune the stroke speed of the shaker to the new material. If a cam or other physical device establishes stroke speed, then the cam must be changed to alter the stroke speed. Therefore, not only is the initial tuning of stroke speed for conveying a particular material time consuming and inefficient, but any adjustments to the stroke speed of the shaker for the conveyance of different materials is inefficient, time-consuming, and difficult to perform. Likewise, if during the course of operation, it becomes apparent that the conventional shaker table has lost conveying efficiency due to wear or slight changes in the conveyed material, it is nearly impossible to adjust the stroke speed of the conveyor to overcome the loss of efficiency without major, time-consuming changes to the linkages.

Thus, there exists a need in the art for a shaker conveyor assembly that is of simple and efficient construction and that has an adjustable stroke speed. In addition, there remains a need in the art for a shaker conveyor assembly that is electronically controllable.

SUMMARY OF THE INVENTION

The present invention overcomes the disadvantages in the related art in a shaker conveyor assembly for moving objects including a conveying element adapted for movement in first and second directions in repeated rectilinear fashion so as to convey items placed on the conveying element in one of the directions. The assembly also includes an electric drive assembly having an output that is interconnected between the electric drive assembly and the conveying element. In addition, the assembly includes a control assembly and at least one sensor operatively connected in electrical communication with the control assembly. The sensor is adapted to sense movement of the output of the electric drive assembly. The control assembly is in electrical communication with the electric drive assembly and is adapted to selectively provide a first level of electrical power to the electric drive assembly during a first portion of the reciprocal movement of the conveying element and a second level of power to the electric drive assembly during a second portion of the reciprocal movement of the conveying element. The control assembly is further adapted to provide selective control over the duration of the first and second portions of the reciprocal movement of the conveying element to thereby control the speed of each of the directions of reciprocal movement of the conveying element.

In this way, a wide variety of materials are advanced along the length of the conveying element until they are discharged. The repeated, rectilinear movement of the drive system, at either different forward and reverse speeds or at the same forward and reverse speeds, moves material in the direction of the conveyor.

The shaker conveyor assembly of the present invention has the advantage of simple and efficient construction and it has an adjustable stroke speed that is electronically controllable. Thus, the stroke speed of the conveyer of the present invention can be efficiently tuned to the items or material to be conveyed and the adjustment is an electronic control so that it can be performed easily at any time and without physically reconfiguring the conveyor.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
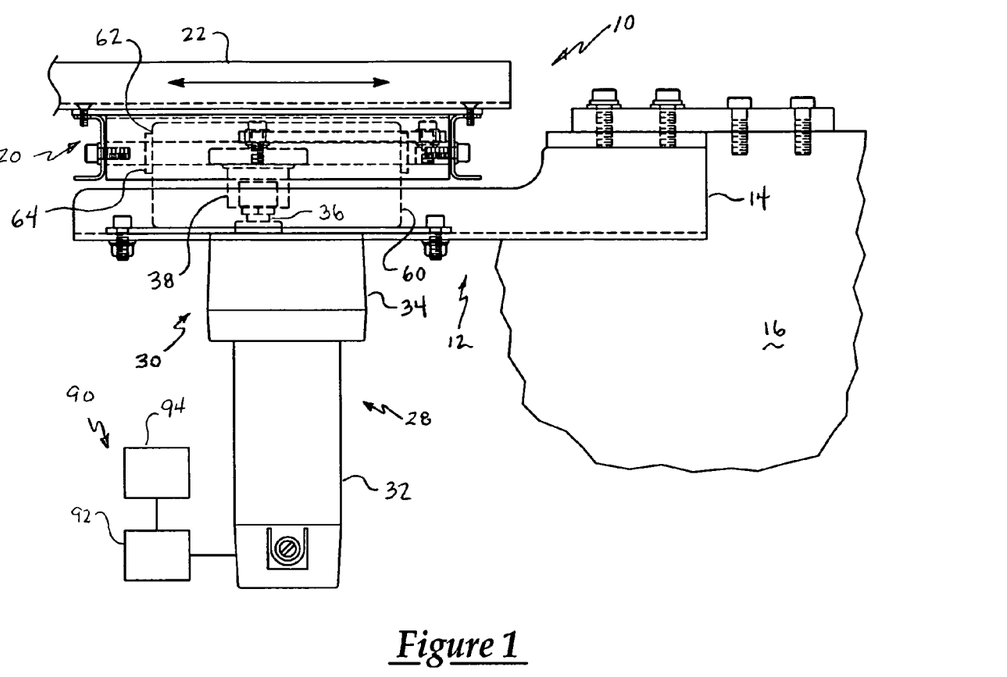
FIG. 1 is a side view of a shaker conveyor assembly of the present invention.
Figure 2:
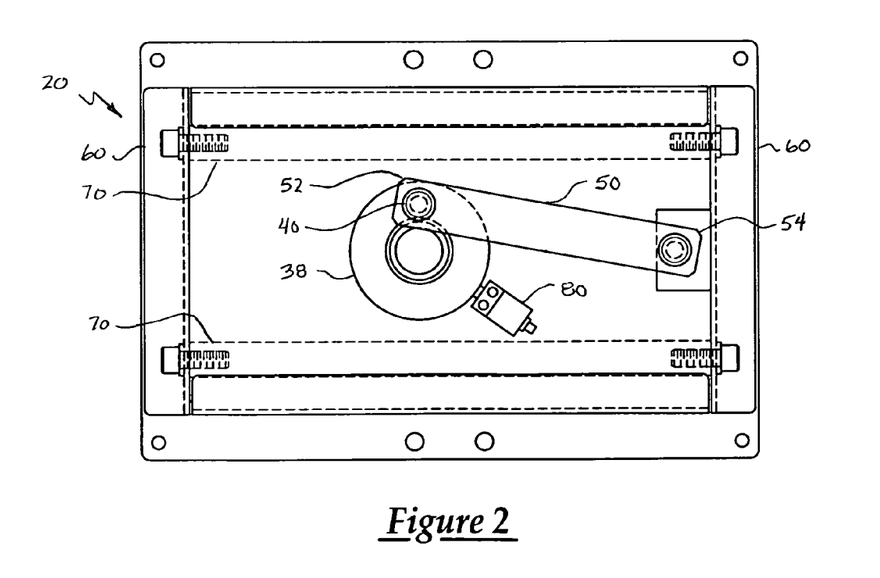
FIG. 2 is a partially cut-away top view of the shaker conveyor assembly of the present invention.
Figure 3:
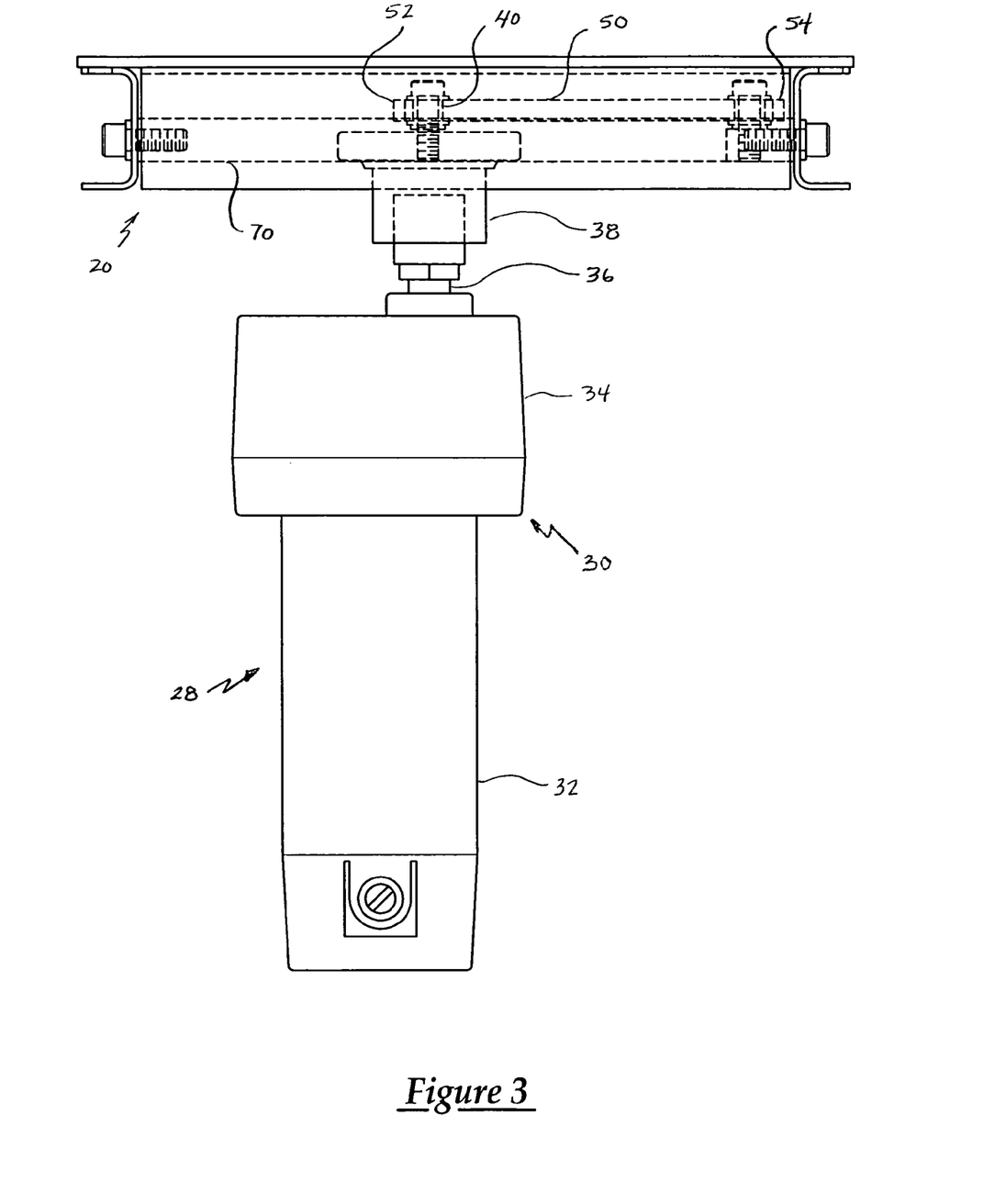
FIG. 3 is a partial cross-sectional side view of the shaker conveyor assembly of the present invention.

One embodiment of the shaker conveyor assembly of the present invention is generally indicated at 10 in FIGS. 1 through 3, where like numerals are used to designate like structure throughout the drawings. The shaker conveyor assembly 10 may be employed in any number of applications and neither the preceding discussion nor the description of the invention that follows should be interpreted as limiting the present use of the invention.

Referring now to FIG. 1, the conveyor assembly 10 of the present invention includes a stationary base, generally indicated at 12. It should be appreciated by those having ordinary skill in the art that due to the wide variety of possible applications and operating environments that the present invention may be incorporated into any type of mounting that rigidly supports the conveyor assembly 10. For example, the stationary base 12 may be a mounting bracket 14 (as illustrated in FIG. 1) or the like that further secures the conveyor assembly 10 to a larger device 16 that supplies the conveyor assembly with items to be conveyed, or simply a rigid framework mounted to the floor.

The conveyor assembly 10 further includes a conveying element generally indicated at 20 that is operatively mounted to the stationary base 12 such that the conveying element 20 is capable of movement in a first direction and a second direction reciprocally with respect to the base 12 and that is adapted to convey items placed on the conveying element 20 in one of the directions. A tray, or trough 22 is mounted to the conveying element 20 to accept and advance the items. Thus, the first and second reciprocal directional movements are the functional forward and reverse strokes of the conveying element 20 and the tray 22. To this end, as will be discussed in greater detail below, the forward stroke of the conveying element is at a first speed such that the items move in the desired forward direction on the tray 22. Then, the reverse stroke occurs at a second speed at which the inertia of the conveying items either causes them to remain in their relative position and slide on the tray as it moves in the reverse stroke or to slide in a continuation of forward movement as the tray moves backward. In either case, the next consecutive reciprocal forward stroke of the conveying element 20 and tray 22 further advances the items.

It should be appreciated that the terms forward and reverse as applied to the strokes of a shaker table are relative. Furthermore, whether the first or the second speed is higher than, or the same as, the other may depend upon the material to be conveyed and its interaction with the shaker table, such that the griping and sliding actions can be made to occur in either direction as long as the resultant conveyance of the material is in the desired direction.

The conveyor assembly of the present invention further includes an electric drive assembly, generally indicated at 28 as well as a transmission assembly, generally indicated at 30.

The electric drive assembly 28 and transmission assembly 30 cooperate to provide repeated, rectilinear movement to the conveying element 20 and tray 22. The structural components of the electric drive assembly 28 and transmission assembly 30 are described in further detail below. However, those having ordinary skill in the art will appreciate that any manner of electrical drive assembly and transmission assembly that provide reciprocal movement to the conveying element may be employed in connection with the present invention. For example, the transmission assembly 30 may be a gear reduction assembly, a torque multiplying device, or some manner of operative connection that provides direct torque translation from the electric drive assembly 28.

In the preferred embodiment, the electric drive assembly 28 includes an electric motor 32 that has a rotational output, and the transmission assembly 30 includes a gear reduction assembly 34 that is mounted directly to the electric motor 32. The gear reduction assembly 34 takes the rotational output of the motor 32 and by way of a gear assembly (not shown) reduces the speed and increases the torque of the rotational output of the motor 32, and provides a second rotational output on an output shaft 36. An output flange 38 is mounted to the output shaft 36. As best seen in FIG. 2, the output flange 38 has an eccentric mounting point 40. It should be appreciated that, although not specifically necessary to accomplish the goals of the present invention, a gear reduction assembly allows for a wider variety of electric motors to be to employed and will allow easier control over the motor operation as will be discussed below.

The conveyor assembly 10 further includes a drive arm 50 having a first end 52 that is pivotably mounted to the eccentric mounting point 40 of the output flange 38 and a second end 54 that is pivotably mounted to the conveying element 20. The eccentric mounting point 40 and the drive arm 50 are adapted to cause the conveying element 20 to move reciprocally for each revolution of the rotational output. As best shown in FIG. 1, in the preferred embodiment, the base 12 further includes support brackets 60 that support the reciprocal movement of the conveying element 20 and the tray 22. The support brackets 60 extend upward from the motor 32, encompasses the output flange 38 and drive arm 50, and includes support openings 62. The support openings 62 retain bushings 64 that allow for the reciprocal passage of a plurality of slide rods 70 (FIG. 2). The sliding interaction of the bushings 64 and the slide rods 70 provide for support and low-friction reciprocal movement for the forward and reverse strokes of the conveying element 20 while preventing any torsional movement.

The conveyer assembly 10 also includes a reference sensor 80 that is disposed about the circumferential edge of the output flange 38. The reference sensor 80 is representative of one of any of a variety of sensors that is capable of providing an electronic signal that represents the passage of a particular angular point located upon the circumference of the output flange 38, such as a hall effect sensor or a proximity switch, for example. However, in the preferred embodiment, the reference sensor 80 is one of the types of sensor that does not rely on physical contact between the sensor 80 and the output flange 38. As will be discussed below, the reference sensor 80 is employed to electronically recognize a reference point on the output flange 38 as it rotates.

The conveyor assembly 10 also includes a control assembly generally indicated at 90 in FIG. 1. The control assembly 90 is in electrical communication with the electric motor 32 and is adapted to selectively provide a first level of electrical power to the motor during a first portion of each revolution of the output flange 38 and a second level of power to the motor during a second portion of each revolution of the output flange 38. The control assembly 90 is further adapted to provide selective control over the duration of the first and second portions of each revolution, thereby controlling the speed of the forward and reverse strokes of the conveying element 20. More specifically, the control assembly 90 includes a motor power supply 92 and a control module 94 that are illustrated schematically in FIG. 1. The motor power supply 92 provides the necessary electromotive force to cause the electric motor 32 to operatively drive the gear reduction assembly 34 and the conveyor element 20. The control module 94 operatively controls the power output from the motor power supply 92 as provided to the electric motor 32. Sensor 80 is operatively connected in electrical communication to the control module 94. The control module 94 receives an input from the reference sensor 80 so the control module 94 recognizes each revolution of the output flange 38.

Operationally, the control module 94 provides a number of modes of variable electronic control over the power supplied to the motor 32 so that the forward and reverse stroke speeds are electronically controllable and easily adjustable. First, the control module 94 provides a first level of electrical power to the motor 32 during a first portion of each revolution of the output flange 38 and a second level of power to the motor 32 during a second portion of each revolution. In this manner, the motor 32 will operate at a particular predetermined speed for the first level of provided power and at a different predetermined speed for the second level of provided power. However, while the first and second levels of supplied power produce two predetermined speeds, the abovementioned first and second periods of angular duration for these power levels (for each revolution of the output flange 38) are electronically adjustable though the control module 94. In other words, the angular duration of the first period of output flange rotation has a first speed that is adjustable with respect to the angular duration of the second period of output flange rotation that has a second speed. It should be appreciated that the electronic control over the speed of the motor may be accomplished by either a change in the supplied current or in the supplied voltage. In the preferred embodiment, the supplied voltage is increased when the first level of power is provided and decreased when the second level of power is provided. However, those having ordinary skill in the art will appreciate from the overall description of the present invention that the supplied voltage may be decreased when the first level of power is provided and increased when the second level of power is provided. Alternatively, the conveyor assembly of the present invention is further operable to move items along the conveying element when the supplied voltage at the first and second levels of power is the same.

Thus, with regard to the first mode of controlling the stroke speeds of the conveying element 20, the preferred embodiment of the control module 94 allows selective electronic control over the duration of the increased supply voltage (first speed) during the forward stroke portion of the conveyer element 20. The remainder of the output flange rotation occurs at the second, lower supply voltage (second speed). It should be appreciated that while the application of a higher voltage to the motor is selectively controlled as an angular portion of each rotation of the output flange 38, due to the gear reduction assembly 34, the length of duration of either supply voltage to the motor 32 occurs over many motor revolutions. This inherently allows accurate and efficient control over the changes in the speed of the output flange 38. It should be further appreciated that the lowered level of supplied power for the second speed may also be 0 (zero) or no voltage so that the motor 32 is not powered and coasts through this portion of the output flange rotation.

Functionally, in one representative example, the full forward stroke may be provided with a higher supply voltage and the full reverse stroke may be provided with a lower supply voltage. Conversely, depending upon the material to be conveyed and how movement of the material is best controlled, the voltages may be reversed. However, the shaker conveyor 10 generally provides the best conveyance for the widest variation of items to be conveyed when the forward stroke is provided with the higher voltage and increased in speed. In particular, in one application the inventors have found that the present invention provides one efficient conveying result when the control module 94 provides the first voltage to the motor 32 during approximately 60 degrees of the forward stroke portion of the output flange rotation, with an adjustable range of +20 degrees. The remainder of the output flange rotation is then supplied with the second or lower level of voltage so that the motor operates at the predetermined lower speed. However, and as noted above, the first and second voltages may be lower and higher, respectively, or they may be equal.

When adjusted so that the angular duration of the higher supplied voltage occurs only during part of the forward stroke, the speed of the forward stroke will vary as the conveyer element 20 and tray 22 move forward, while the reverse stroke speed will be lower and generally decreasing. The ability to make this adjustment has certain advantages that relate to the weight of the conveyed items and their frictional interaction with the surface of the tray 22. For example, heavier items or those with higher frictional interaction with the tray may be conveyed easier along the tray where the tray accelerates before it reaches the end of the forward stroke so that the item has greater forward momentum before the tray reverses. In this example, the present invention allows for an adjustable period of lower supply voltage to be provided to the motor, which is used to adjust the relative speed of the forward movement of the conveyed items. Thus, the stroke speed of the conveyer can be efficiently tuned to the items or material to be conveyed and the adjustment is an electronic control so that it can be performed easily at any time and without physically reconfiguring the conveyor. It should be appreciated that the tuning of the present invention may also include employing a first voltage that is lower than the second voltage to accomplish the same efficient conveyance depending on the particular properties of materials and objects to be conveyed.

Additionally, in conjunction with first mode of control over the duration of the first supply voltage, the second mode of control of the control module 94 of the present invention provides the ability to control where first voltage and thus the higher speed angularly begins in the output flange 38 rotation. The reference sensor 80 provides a reference signal to the control module 94 of a particular point on the output flange 38. It should be appreciated that the sensor 80 may be placed anywhere about the output flange 38 or so as to otherwise monitor the reciprocal movement of the tray. Thus, the sensor 80 may be located so as to sense the movement of the tray itself, or any other number of interconnected, moving parts. Likewise, more than one point of reference may be placed on the output flange 38. In the preferred embodiment, the control module 94 is electronically designed to utilize a single reference point. Additionally, while in above-mentioned example of the present invention the first supply voltage is generally set to occur fully in the forward stroke, this is not a limitation. The present invention allows for the possibility that the most efficient conveying of a particular item may require that the beginning of the first stroke speed occur before the reverse stroke is completed. In fact, since this second mode of adjustment allows for the beginning of the first supply voltage to be adjusted to occur at any angular position of the output flange 38 rotation, then the strokes may even be electronically reversed to make the conveyer element 20 and tray 22 convey items in the opposite direction, if necessary.

Additionally, even though the preferred embodiment of the present invention utilizes two predetermined voltages and thus two predetermined and fixed motor speeds, a third mode of control is possible when the control module 94 provides selective control over the actual voltage values of the two supply voltages. In other words, the control module 94 of the present invention provides the ability to adjust the voltage levels of the two supplied voltages so that the difference between the speed of the forward and reverse strokes are separately controllable.

It should be appreciated that the above-mentioned adjustment capabilities of the control module 94 are electronically controlled. In this regard, the control module 94 may have physical controls installed for manual adjustment, such as potentiometers or rheostats, for example. Similarly, the control module may be electronically controlled through software or other computer based control inputs.

Figure 4:
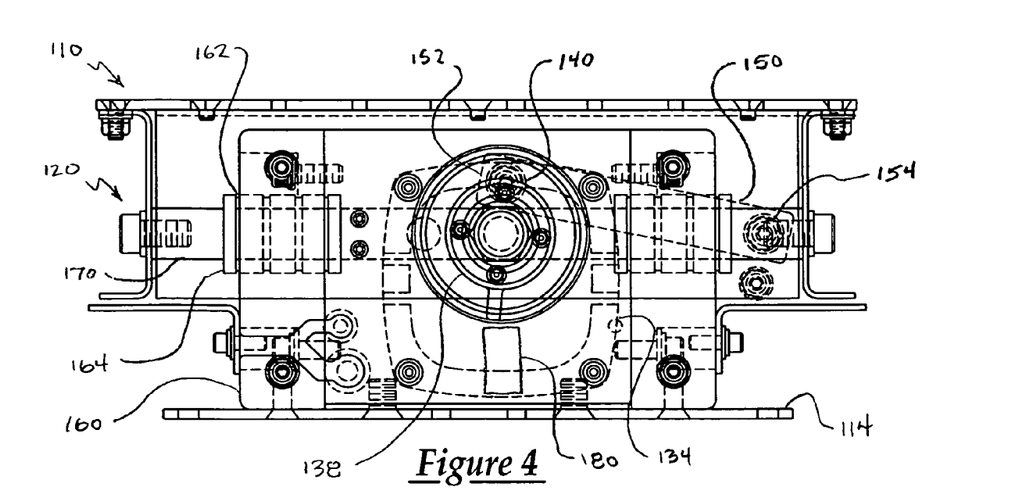
FIG. 4 is a partially cut-away top view of another embodiment of the shaker conveyor assembly of the present invention.
Figure 5:
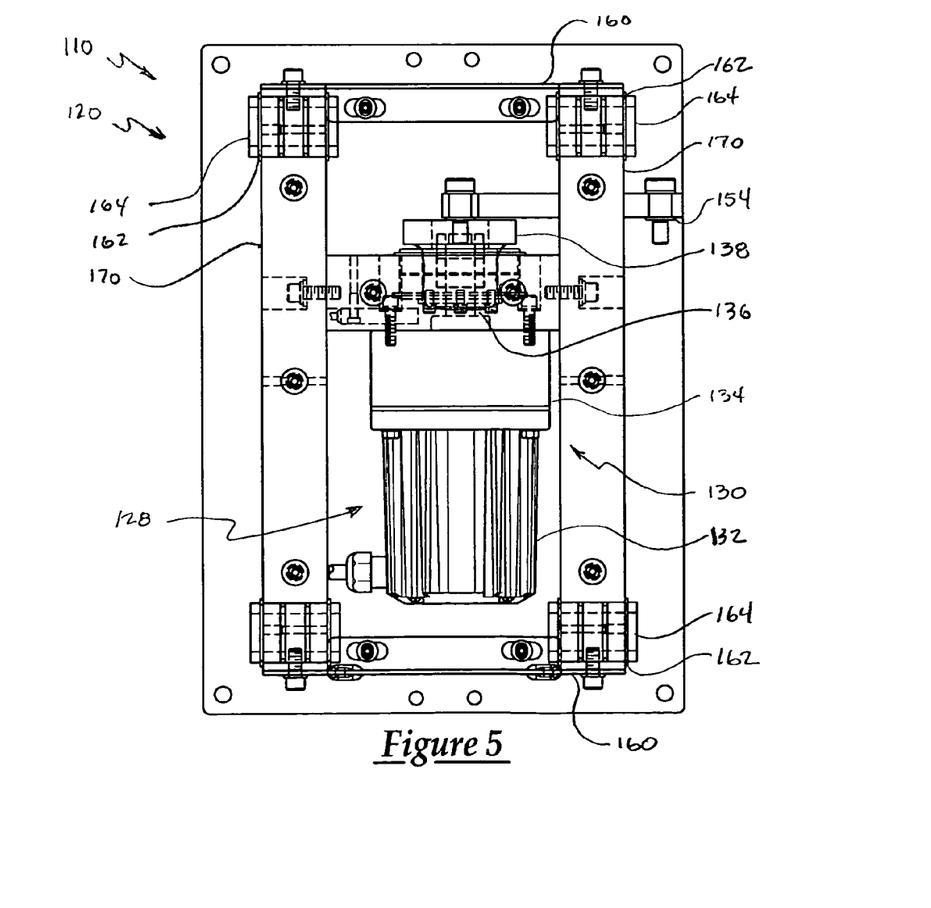
FIG. 5 is a partial cross-sectional top view of the shaker conveyor assembly of the present invention illustrated in FIG. 4.

Referring now to FIGS. 4 and 5, where like numerals increased by 100 are used to designate structure like that of FIGS. 1 through 3, a second exemplary embodiment of the shaker conveyor assembly of the present invention is generally indicated at 110. This embodiment includes a base plate 114 that further secures the conveyor assembly 110 to another device or mounts to the floor. A conveying element, generally indicated at 120 holds a conveyor tray or table (not shown). The electric drive assembly, generally indicated at 128 as well as a transmission assembly, generally indicated at 130 are mounted to the base plate such that the longitudinal axis of the motor generally lies in a plane that is in a generally parallel to a plane containing the conveyor movement. This mounting arrangement allows for a very low vertical profile such that the conveyor 110 may be placed very close to the floor or very close vertically to another operative device with respect to the conveying tray (not shown).

The electric drive assembly 128 includes an electric motor 132 that has a rotational output, and the transmission assembly 130 includes a gear reduction assembly 134 that is mounted directly to the electric motor 132. The gear reduction assembly 134 takes the rotational output of the motor 132 and by way of a gear assembly (not shown) reduces the speed and increases the torque of the rotational output of the motor 132, and provides a second rotational output on an output shaft 136. An output flange 138 is mounted to the output shaft 136. The output flange 138 has an eccentric mounting point 140. The conveyor assembly 110 further includes a drive arm 150 having a first end 152 that is pivotably mounted to the eccentric mounting point 140 of the output flange 138 and a second end 154 that is pivotably mounted to the conveying element 120. The eccentric mounting point 140 and the drive arm 150 are adapted to cause the conveying element 120 to move reciprocally for each revolution of the rotational output. The base plate 114 further includes support brackets 160 that support the reciprocal movement of the conveying element 120 and the tray. The support brackets 160 extend upward from the motor 132, encompasses the output flange 138 and drive arm 150, and includes support openings 162. The support openings 162 retain bushings 164 that allow for the reciprocal passage of a plurality of slide rods 170. The sliding interaction of the bushings 164 and the slide rods 170 provide for support and low-friction reciprocal movement for the forward and reverse strokes of the conveying element 120 while preventing any torsional movement.

The conveyer assembly 110 also includes a reference sensor 180 that is disposed about the circumferential edge of the output flange 138 or so as to otherwise monitor the reciprocal movement of the tray. Thus, the sensor 180 may be located so as to sense the movement of the tray itself, or any other number of interconnected, moving parts. The reference sensor 180 is representative of one of any of a variety of sensors that is capable of providing an electronic signal that represents the passage of a particular angular point located upon the circumference of the output flange 138, such as a hall effect sensor or a proximity switch, for example. However, in the preferred embodiment, the reference sensor 180 is one of the types of sensor that does not rely on physical contact between the sensor 180 and the output flange 138. The reference sensor 180 is employed to electronically recognize a reference point on the output flange 138 as it rotates. The conveyor assembly 110 is operatively controlled by a control assembly having a motor power supply and a control module as discussed above in accordance with the embodiment illustrated in FIGS. 1 through 3. The conveyor assembly 110 provides the functional and structural advantages of conveyor assembly 10 with the added feature of a low vertical profile that allows it to be operatively placed in smaller areas and tighter confines.

From the foregoing description taken in view of the drawings, those having ordinary skill in the art will appreciate that applicant has presented two embodiments illustrating different configurations of the electric motor 32, 132 relative to the conveying element 22, 122. In the embodiments illustrated in FIGS. 1-3, the longitudinal axis of the electric motor 32 is generally perpendicular to the conveying element 22. In the embodiment illustrated in FIGS. 4-5, the longitudinal axis of the electric motor 132 is generally parallel to a plane containing the conveying element 122. The representative examples of the present invention illustrated in FIGS. 1-5 are simply two different configurations, among other possible configurations, that may be employed within the scope of the claims that follow. Those having ordinary skill in the art will appreciate that the specific configuration of the motor relative to the conveying element is not important and will be dictated by engineering expedience on the basis of any given particular application.

In addition, the control assembly 94 employed in connection with the present invention may include any suitable control system generally known in the related art, including but not limited to, a computer or other programmable controller. Similarly, the electric motor 32, 132 may include, but is not limited to any type of AC or DC motor. For example, the electric motor may be a brushed or brushless DC motor, a brushed or brushless AC motor, or any type of servo motor.

Figure 6:
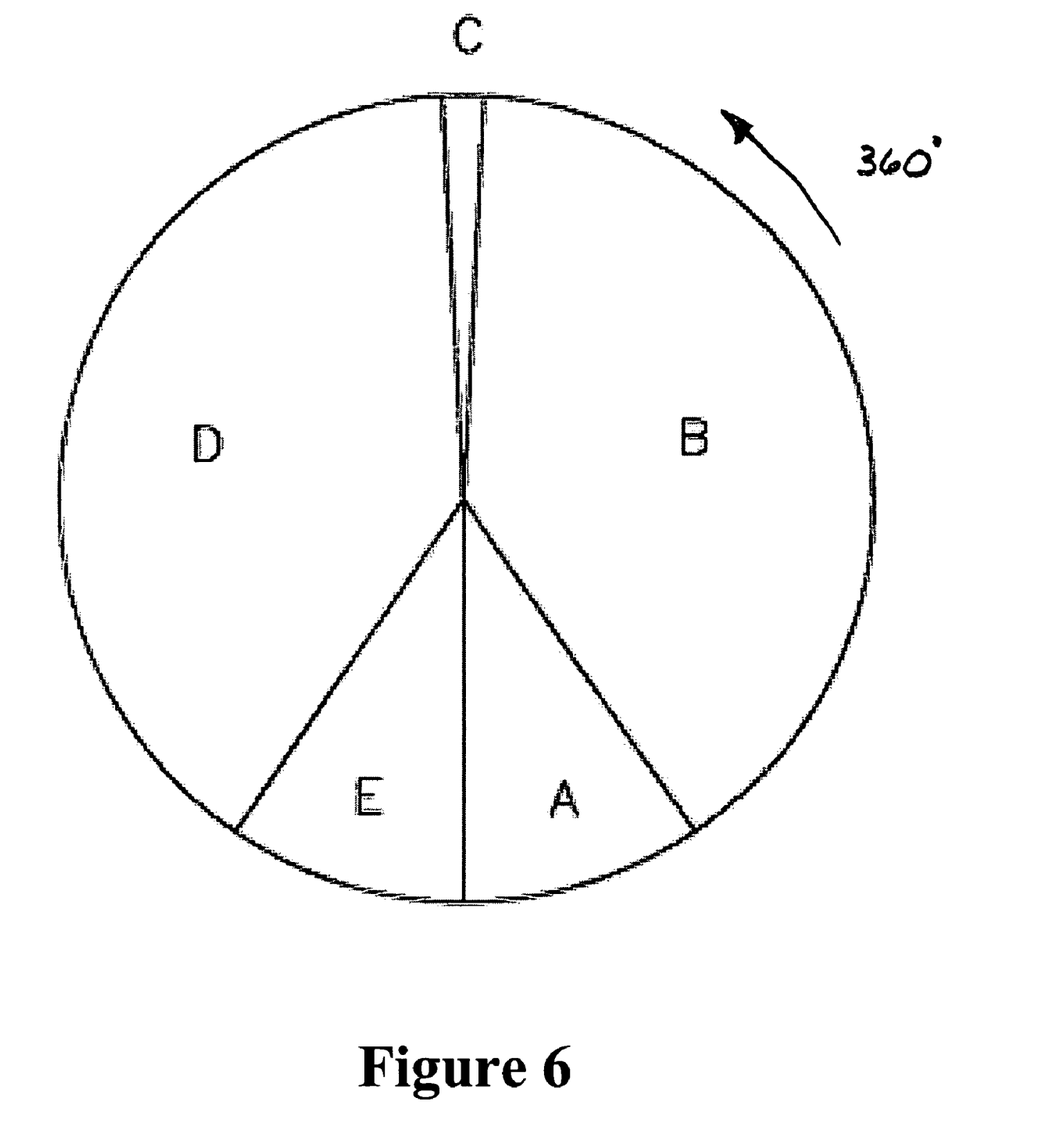
FIG. 6 is a pie chart illustrating one representative example of different phases of rectilinear movement of the tray of the conveying element through a 360° movement of the output that is operatively connected to the tray of the conveying element of the present invention.

FIG. 6 illustrates the different phases of rectilinear movement of the tray 22, 122 of the conveying element 20, 120 using a pie chart to represent a 360° cycle. As noted above, those having ordinary skill in the art will appreciate that the motor may produce a number of revolutions for each 360° rotation representatively illustrated by the pie chart of FIG. 6. Nevertheless, one possible cycle may be described with respect to this chart where the process starts at Section A and proceeds counterclockwise about the chart illustrated in FIG. 6 to the section labeled "E." In Section A, the work piece is gripped by the tray and the movement of the tray in a first direction accelerates. In Section B, the work piece continues to move in the first direction of movement of the tray at a substantially constant speed. In Section C, the tray is quickly decelerated and the work piece begins to slip in the direction of the movement of the tray and relative to the tray under the force of its own forward momentum. In Section D, the tray moves in a second direction, opposite to the first direction, and relative to the work piece which is either generally stationary or continues to move in the first direction under the force of its own momentum. In Section E, the tray decelerates in anticipation of a change from the second direction back toward the first direction and the acceleration and gripping phase of Section A. In one embodiment, the speed of the tray moving in the first direction is faster than the speed of the tray moving in the second direction. However, as noted above, those having ordinary skill in the art will appreciate that these relative speeds may be reversed in a manner which still provides movement in a first direction. Alternatively, the speed and acceleration of the tray may be configured so that the work piece moves in the second direction. In short, work piece movement relative to the tray is a function of the program commands received by the electric motor from the controller. Those having ordinary skill in the art will further appreciate that the cycles illustrated in FIG. 6 are merely representative and that there exists an unlimited number of configurations that may be employed to effectively move a work piece along the tray of the conveying element in either the first or second directions.

The sensor senses the position of the tray as a function of the output of the electric motor and the controller controls the speed and timing of the electric motor to effectively and efficiently move a work piece in each of the first and second directions, as needed. In this case of a programmable controller, the sensor may simply be used to find a "home" position of the tray 22 and the motor may be thereafter controlled with reference to the original sensed "home" position.

The shaker conveyor assembly of the present invention has the advantage of simple and efficient construction and it has an adjustable stroke speed that is electronically controllable. Thus, the stroke speed of the conveyer of the present invention can be efficiently tuned to the items or material to be conveyed and the adjustment is an electronic control so that it can be performed easily at any time and without physically reconfiguring the conveyor.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the claims, the invention may be practiced other than as specifically described.

What is claimed is:

1. A shaker conveyor assembly for moving objects, said assembly comprising:
a conveying element adapted for movement in first and second directions in repeated rectilinear fashion so as to convey items placed on said conveying element in one of said directions;
an electric drive assembly including an electric motor having a rotary output including an output flange operatively interconnected and disposed between said electric drive assembly and said conveying element;
a control assembly and at least one sensor operatively connected in electrical communication with said control assembly, said sensor adapted to sense rotational movement of said output flange and to communicate the angular position of said output flange to said control assembly; and
said control assembly in electrical communication with said electric drive assembly and adapted to selectively provide a first level of electrical power to said electric drive assembly during a first portion of said movement of said conveying element and a second level of power to said electric drive assembly during a second portion of said movement of said conveying element, said control assembly further adapted to provide selective control over the duration of said first and said second portions of said movement thereby controlling the speed of each of said directions of said movement of said conveying element.

2. A shaker conveyor assembly as set forth in claim 1 wherein said sensor is disposed in non-contacting relationship with respect to said output of said electric drive assembly to sense movement of said output.

3. A shaker conveyor assembly as set forth in claim 1 wherein said electric motor includes a DC motor.

4. A shaker conveyor assembly as set forth in claim 1 wherein said electric motor includes a AC motor.

5. A shaker conveyor assembly as set forth in claim 1 wherein said electric motor includes a servo motor.

6. A shaker conveyor assembly as set forth in claim 1 further including a transmission assembly operatively connected between said electric drive assembly and said output to provide torque translation therebetween.

7. A shaker conveyor assembly as set forth in claim 1 wherein said controller provides a first higher level of electrical power to said electric drive assembly during said first portion of said movement and a second, lower level of power to said electric drive assembly during said second portion of said movement to convey items placed on said conveyor element in said first direction.

8. A shaker conveyor assembly as set forth in claim 1 wherein said control assembly provides a first lower level of electrical power to said electric drive assembly during said first portion of said movement and a second, higher level of power to said electric drive assembly during said second portion of said movement to convey items placed on said conveyor element in said first direction.

9. A shaker conveyor assembly as set forth in claim 8 wherein said first and second levels of electrical power provided by said control assembly to said electric drive assembly are substantially the same.

10. A shaker conveyor assembly as set forth in claim 1 wherein said control assembly includes a programmable controller.

11. A shaker conveyor assembly for moving objects, said assembly comprising:
a conveying element adapted for movement in first and second directions in repeated rectilinear fashion so as to convey items placed on said conveying element in one of said directions;
an electric drive assembly including an electric motor having a rotary output including an output flange operatively interconnected and disposed between said electric drive assembly and said conveying element;
a programmable control assembly and at least one sensor operatively connected in electrical communication with said control assembly, said sensor adapted to sense rotational movement of said output flange and to communicate the angular position of said output flange to said programmable control assembly;
a transmission assembly operatively connected between said electric drive assembly and said output to provide torque translation therebetween; and
said programmable control assembly in electrical communication with said electric drive assembly and adapted to selectively provide a first level of electrical power to said electric drive assembly during a first portion of said movement of said conveying element and a second level of power to said electric drive assembly during a second portion of said movement of said conveying element, said control assembly further adapted to provide selective control over the duration of said first and said second portions of said movement thereby controlling the speed of each of said directions of movement of said conveying element.

12. A shaker conveyor assembly as set forth in claim 11 wherein said sensor is disposed in non-contacting relationship with respect to said output of said electric drive assembly to sense movement of said output.

13. A shaker conveyor assembly as set forth in claim 11 wherein said electric motor includes a DC motor.

14. A shaker conveyor assembly as set forth in claim 11 wherein said electric motor includes a AC motor.

15. A shaker conveyor assembly as set forth in claim 11 wherein said controller provides a first higher level of electrical power to said electric drive assembly during a first portion of said movement and a second, lower level of power to said electric drive assembly during said second portion of said movement to convey items placed on said conveyor element in said first direction.

16. A shaker conveyor assembly as set forth in claim 11 wherein said control assembly provides a first lower level of electrical power to said electric drive assembly during a first portion of said movement and a second, higher level of power to said electric drive assembly during said second portion of said movement to convey items placed on said conveyor element in said first direction.

17. A shaker conveyor assembly as set forth in claim 11 wherein said first and second levels of electrical power provided by said control assembly to said electric drive assembly are substantially the same.

* * * * *